(12) United States Patent
Shibata

(10) Patent No.: US 10,442,013 B2
(45) Date of Patent: Oct. 15, 2019

(54) CUTTING INSERT, CUTTING TOOL, AND METHOD OF MANUFACTURING MACHINED PRODUCT USING THE SAME

(71) Applicant: KYOCERA Corporation, Kyoto-shi, Kyoto (JP)

(72) Inventor: Masahiro Shibata, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 74 days.

(21) Appl. No.: 15/682,290

(22) Filed: Aug. 21, 2017

(65) Prior Publication Data

US 2018/0065194 A1 Mar. 8, 2018

Related U.S. Application Data

(62) Division of application No. 14/117,024, filed as application No. PCT/JP2012/061390 on Apr. 27, 2012, now Pat. No. 9,770,767.

(30) Foreign Application Priority Data

May 31, 2011 (JP) .................... 2011-122443

(51) Int. Cl.
  *B23C 5/00* (2006.01)
  *B23C 5/06* (2006.01)
  *B23C 5/22* (2006.01)

(52) U.S. Cl.
  CPC ............. *B23C 5/06* (2013.01); *B23C 5/2221* (2013.01); *B23C 2200/0411* (2013.01);
  (Continued)

(58) Field of Classification Search
  CPC ...... B23C 2210/205; B23C 2200/0488; B23C 2200/0477; B23C 2200/0466; B23C 2200/0472
  See application file for complete search history.

(56) References Cited

U.S. PATENT DOCUMENTS 5,246,315 A   9/1993   Hansson et al.
5,695,303 A   12/1997  Boianjiu et al.
(Continued)

FOREIGN PATENT DOCUMENTS

DE   1020008019426 A1   10/2009
EP        1736266 A1   12/2006
(Continued)

OTHER PUBLICATIONS

Extended European Search Report, European Application No. 17188378.8, dated Jan. 26, 2018, 8 pgs.
(Continued)

*Primary Examiner* — Willmon Fridie, Jr.
(74) *Attorney, Agent, or Firm* — Volpe and Koenig, P.C.

(57) ABSTRACT

A cutting insert of an embodiment of the present invention includes an upper surface, a lower surface, a side surface connected to each of the upper surface and the lower surface, and an upper cutting edge located at an intersection of the upper surface and the side surface. The lower surface includes a mount part having alternately three first top portions spaced a distance a away from a central axis extending between the upper and lower surfaces and three second top portions spaced a distance b away from the central axis in a bottom view. The mount part further has a concave part including at least the central axis. The second top portions are located closer to the upper surface than the first top portions. A cutting tool with the cutting insert, and a method of manufacturing a machined product by using the cutting tool are also provided.

19 Claims, 10 Drawing Sheets

(52) U.S. Cl.
CPC ........... *B23C 2200/0477* (2013.01); *B23C 2200/164* (2013.01); *B23C 2200/165* (2013.01); *B23C 2210/045* (2013.01); *B23C 2210/168* (2013.01); *Y10T 83/04* (2015.04); *Y10T 407/1924* (2015.01); *Y10T 407/1946* (2015.01)

(56) References Cited

U.S. PATENT DOCUMENTS

| | | | |
|---|---|---|---|
| 7,455,483 | B2 | 11/2008 | Koskinen |
| 8,657,539 | B2 | 2/2014 | Morrison et al. |
| 8,858,130 | B2 | 10/2014 | Morrison |
| 9,475,133 | B2 * | 10/2016 | Koga ............... B23C 5/06 |
| 9,533,356 | B2 * | 1/2017 | Koga ............... B23C 5/06 |
| 2001/0051077 | A1 | 12/2001 | Nagata et al. |
| 2002/0146293 | A1 | 10/2002 | Nelson |
| 2007/0071559 | A1 * | 3/2007 | Koskinen ........... B23B 27/16 407/34 |
| 2007/0298230 | A1 | 12/2007 | Omori |
| 2008/0181731 | A1 | 7/2008 | Wallstrom et al. |
| 2009/0290945 | A1 * | 11/2009 | Carl ............... B23B 27/1614 407/113 |
| 2010/0080662 | A1 * | 4/2010 | Satran ............... B23C 5/2213 407/40 |
| 2011/0020080 | A1 * | 1/2011 | Zettler ............... B23C 5/06 407/113 |
| 2015/0190868 | A1 * | 7/2015 | Koifman ............... B23C 5/207 407/11 |

FOREIGN PATENT DOCUMENTS

| | | |
|---|---|---|
| EP | 1952925 A2 | 8/2008 |
| EP | 2004350 B1 | 5/2011 |
| EP | 1931487 B1 | 8/2012 |
| EP | 2665572 A2 | 11/2013 |
| JP | 2008188763 A | 8/2008 |
| JP | 2009533235 A | 9/2009 |
| JP | 2010523352 A | 7/2010 |
| JP | 2011104738 A | 6/2011 |
| TW | 516980 B | 1/2003 |
| WO | 2007037733 A1 | 4/2007 |
| WO | 2008120186 A1 | 10/2008 |
| WO | 2012/099355 A2 | 7/2012 |

OTHER PUBLICATIONS

International Search Report, PCT/JP2012/061390, dated Jul. 18, 2012, 2 pages.
Extended European Search Report, European Patent Application No. 1 279 3811.6, Dec. 22, 2014, 6 pages.
Chinese Office Action with English concise explanation, CN Patent Appln. No. 201280022160.5, dated Jan. 4, 2015, 12 pages.

* cited by examiner

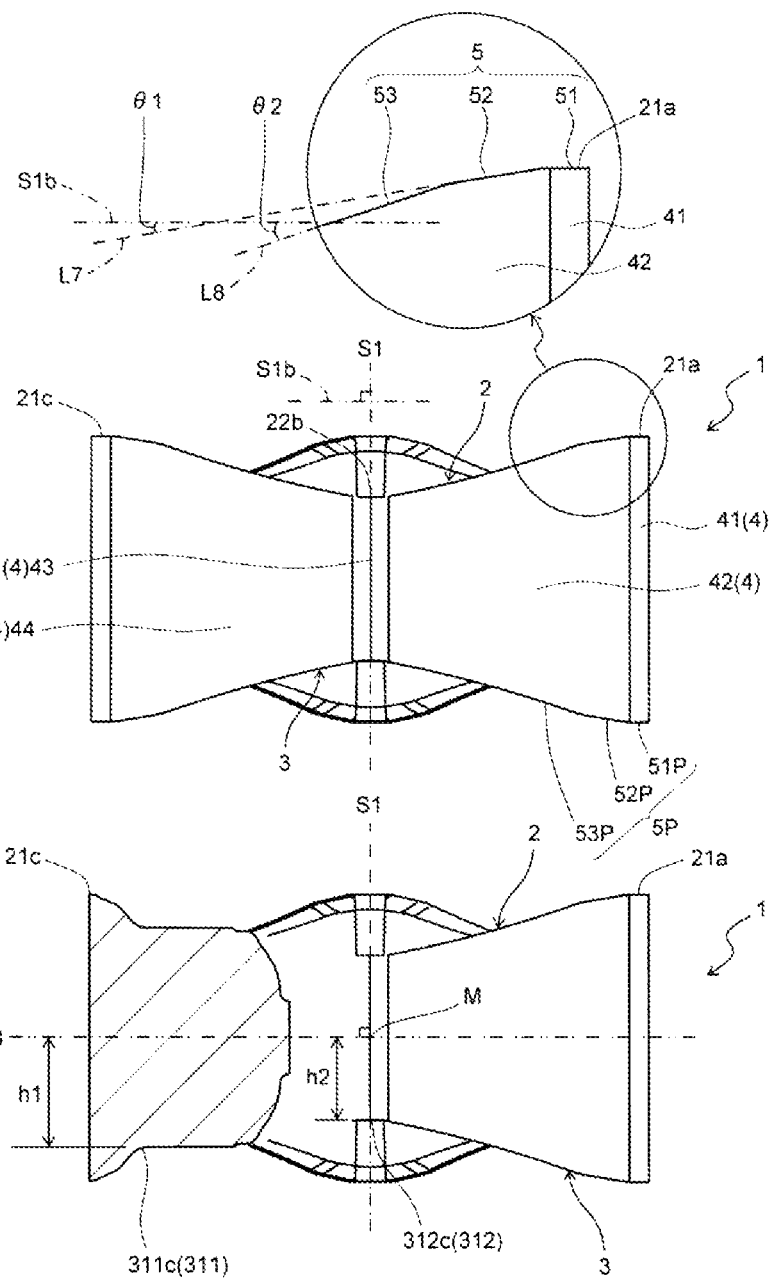

CUTTING INSERT, CUTTING TOOL, AND METHOD OF MANUFACTURING MACHINED PRODUCT USING THE SAME

CROSS-REFERENCES TO RELATED APPLICATIONS

This application is a Divisional of U.S. patent application Ser. No. 14/117,024, filed on Nov. 11, 2013, which claims priority to JP Patent Application No. 2011-122443 filed on May 31, 2011 and to PCT/JP2012/061390 filed on Apr. 27, 2012, which are included by reference in their entirety for all purposes.

FIELD OF INVENTION

The present invention relates to a cutting insert, a cutting tool, and a method of manufacturing a machined product using the same.

BACKGROUND

Conventionally, as a cutting insert (hereinafter referred to as an "insert" in some cases) used for performing a face milling process, an insert whose both hexagonal shaped surfaces are usable has been proposed (for example, refer to International Publication No. 2007/037733).

According to the insert of the International Publication No. 2007/037733, a flat surface is formed on an upper surface as shown in FIGS. 1A and 1E thereof. The flat surface functions as a mount surface brought into contact with an insert pocket when a cutting edge located closer to a lower surface is used.

The above insert is generally obtained by subjecting raw material powder to press molding and firing. However, deformation may occur during the firing due to shape factor and firing environmental variations or the like. For example, even when the surface functioning as the mount surface is molded flat, the deformation may occur by the firing. Consequently, the mount surface of the insert is brought into contact with a position different from an intentional position at a design stage, and thus there is a risk of deterioration of attachment stability.

SUMMARY

An object of the present invention is to provide a cutting insert and a cutting tool each having excellent attachment stability, as well as a method of manufacturing a machined product using the cutting insert and the cutting tool.

A cutting insert according to an embodiment of the present invention includes an upper surface, a lower surface, a side surface connected to each of the upper surface and the lower surface, and an upper cutting edge located at an intersection of the upper surface and the side surface. The lower surface includes a mount part having alternately three first top portions spaced a distance a away from a central axis extending between the upper and lower surfaces and three second top portions spaced a distance b away from the central axis in a bottom view. The mount part further has a concave part including at least the central axis. The second top portions are located closer to the upper surface than the first top portions.

A cutting tool according to an embodiment of the present invention includes the cutting insert of the foregoing embodiment, and a holder configured to attach the cutting insert thereto.

A method of manufacturing a machined product according to an embodiment of the present invention includes: rotating the cutting tool according to the foregoing embodiment on a basis of a rotation axis of the holder; bringing the upper cutting edge of the cutting tool being rotated into contact with a surface of a workpiece; and separating the cutting tool from the workpiece.

In the cutting insert according to the embodiment of the present invention, the lower surface includes the mount part having alternately the three first top portions spaced the distance a away from the central axis extending between the upper and lower surfaces and the three second top portions spaced the distance b away from the central axis in the bottom view. The mount part further has a concave part including at least the central axis. The second top portions are located closer to the upper surface than the first top portions. Thus, the mount part has the concave part and hence the mount part is difficult to contact with the contact surface of the holder in the vicinity of the central axis. It is therefore ensured that the first top portions and the second top portions, each being located closer to the outer edge, function as a fixing point brought into contact with the contact surface of the holder, thereby improving attachment stability.

BRIEF DESCRIPTION OF THE DRAWINGS

FIG. 3(a) is a view of the cutting insert shown in FIG. 2(a), specifically a fragmentary side view taken in the direction indicated by arrow A; FIG. 3(b) is a sectional view thereof taken along line B-B;

DETAILED DESCRIPTION OF THE PREFERRED EMBODIMENTS

<Cutting Insert>

A cutting insert according to an embodiment of the present invention is described in details below with reference to FIGS. 1 to 4.

Figure 1:
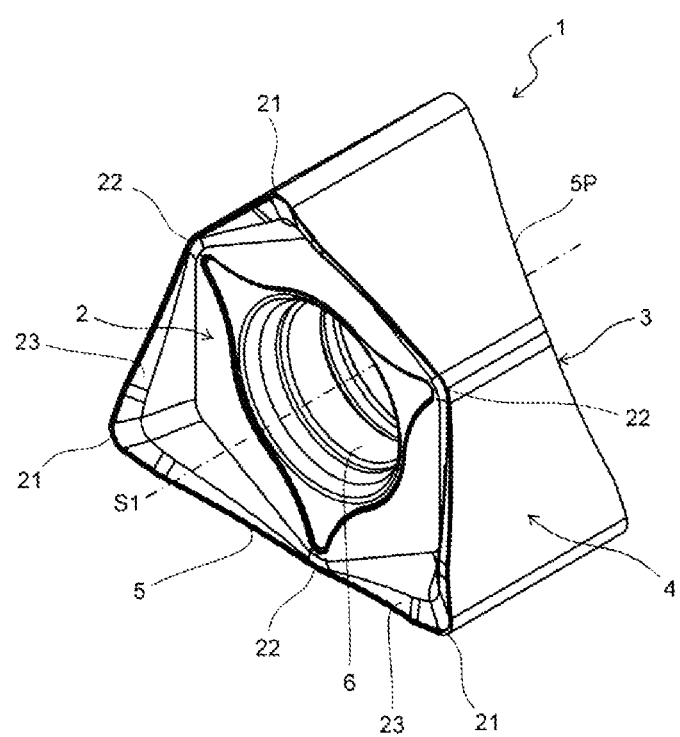
FIG. 1 is a perspective view of a cutting insert according to an embodiment of the present invention.

As shown in FIGS. 1 to 3, the insert 1 of the present embodiment is an indexable type insert used by being fixed to a holder. The insert 1 generally includes an upper surface 2, a lower surface 3, a side surface 4 connected to each of the upper surface 2 and the lower surface 3, a through hole 6 (fitting hole) extending between the upper surface 2 and the lower surface 3, and an upper cutting edge 5 located at an intersection of the upper surface 2 and the side surface 4. As shown in FIG. 2, the through hole 6 of the present embodiment is located at a middle part on each of the upper surface 2 and the lower surface 3.

Figure 2A:
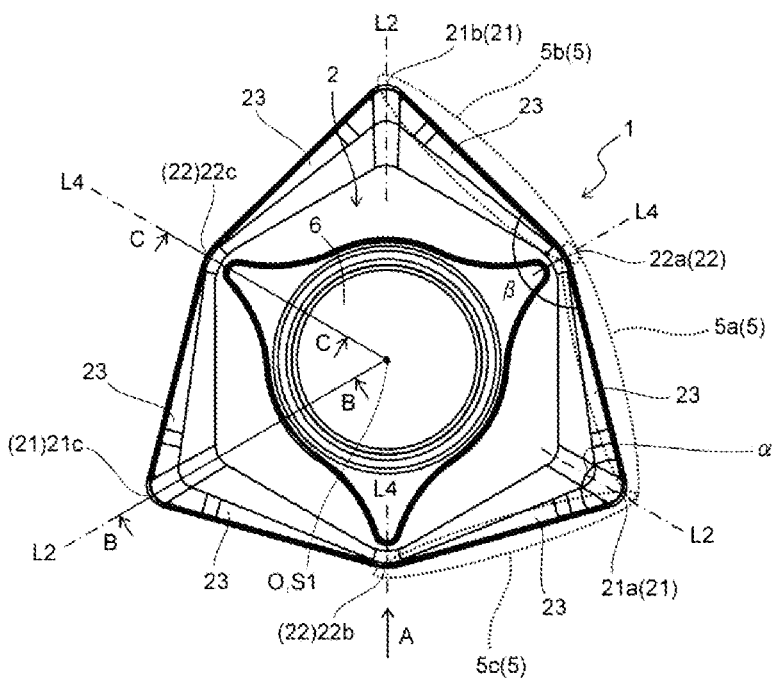
FIG. 2(a) is a plan view (top view) of the cutting insert shown in FIG. 1.
Figure 2B:
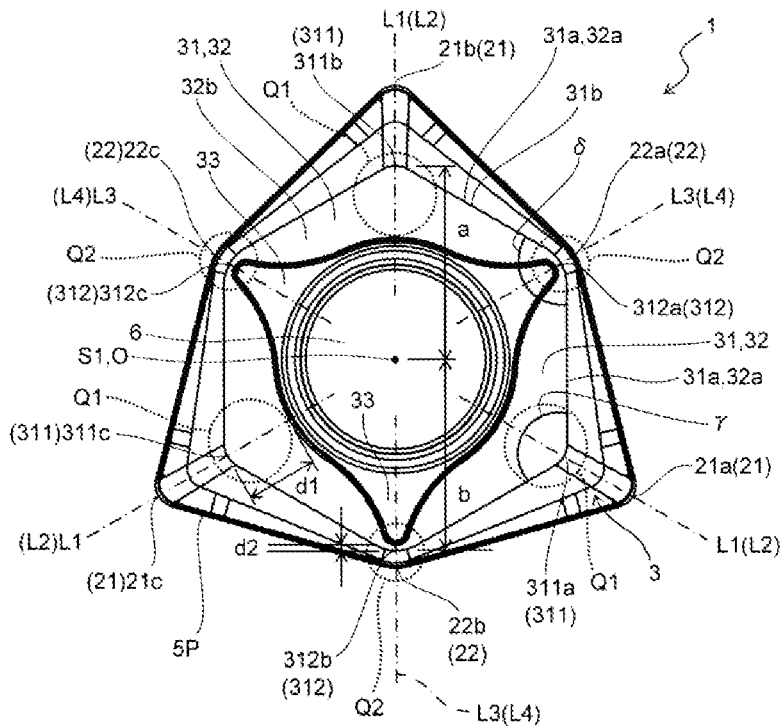
FIG. 2(b) is a bottom view thereof.

The insert 1 of the present embodiment is also a so-called negative type insert and hence further includes a lower cutting edge 5P located at an intersection of the lower surface 3 and the side surface 4 as shown in FIGS. 1 and 2(b). For example, the insert 1 is preferably configured so that one side of the upper surface 2 is 5 mm to 100 mm and the thickness of each of the upper and lower surfaces 2 and 3 is 3 mm to 100 mm.

The insert 1 of the present embodiment has a hexagonal shape (substantially hexagonal shape) as shown in FIG. 2 in a top view and in a bottom view. The phrase "top view" denotes a state that the insert 1 is viewed from the upper surface 2. The phrase "bottom view" denotes a state that the insert 1 is viewed from the lower surface 3.

The concept of the phrase "hexagonal shape" includes somewhat deformation in such a range in which a certain function can be exhibited, without being limited to the case of a strict hexagonal shape (regular hexagon). That is, the hexagonal shape of the present embodiment includes the cases where, for example, individual sides or vertexes thereof have a slightly curved line shape.

Further, the upper surface 2 (upper cutting edge 5) and the lower surface 3 alternately have three major corners 21 (first to third major corners 21a to 21c), each having a first interior angle $\alpha$, and three minor corners 22 (first to third minor corners 22a to 22c), each having a second interior angle $\beta$ larger than the first interior angle $\alpha$. Thus, the insert 1 includes the upper cutting edge 5 and the lower cutting edge 5P of identical shape which are extended from the single major corners 21 to the two adjacent minor corners 22 and 22 on both sides of the single major corner 21. Therefore, a cutting process can be performed at each of the three major corners 21 by causing a bidirectional rotation for a right-handed operation and a left-handed operation. That is, the insert 1 of the present embodiment is usable as an insert substantially having the six major corners by using each of the three major corners 21 for the right-handed operation and the left-handed operation.

The first interior angle $\alpha$ is preferably a substantially right angle. The phrase "substantially right angle" denotes an approximately right angle. Specifically, the substantially right angle in the present embodiment is in the range of 90°±3°. Particularly, the first interior angle $\alpha$ is preferably larger than 90°. The second interior angle $\beta$ is preferably set in the range of 140° to 150°. The lengths of the individual sides are preferably identical from the viewpoint of ensuring a large length of the cutting edges contributing to cutting while using all of the individual sides for the cutting process.

In the insert 1 of the present embodiment, the upper cutting edge 5 is located over the entire circumference of the upper surface 2. Thereby, the three major corners 21 of the insert 1 are usable for the cutting process. Thus, when the cutting process is performed using the upper cutting edge 5, a part of the lower surface 3 functions as a mount surface (seating surface) for attaching a holder 11 described later.

As described above, the insert 1 of the present embodiment is the so-called negative type insert allowing both the upper surface 2 and the lower surface 3 to be respectively used as the surface that exhibits a rake function as shown in FIGS. 1 and 2. Accordingly, when the cutting process is performed using the lower cutting edge 5P, a part of the lower surface 3 is usable as a rake surface, and a part of the upper surface 2 is usable as the mount surface (seating surface). That is, the upper surface 2 and the lower surface 3 of the insert 1 of the present embodiment have the same shape, and both the upper and lower surfaces are usable for the cutting process. Unless otherwise stated, the description of the upper surface 2 is applicable to the lower surface 3.

Next, the individual components of the insert 1 of the present embodiment are described in details.

The upper surface 2 includes a rake surface 23 that has a so-called rake function for discharging chips and is inclined downward, namely, toward the lower surface 3, as going inward from the upper cutting edge 5. The term "inward" denotes being located inside the insert 1 with respect to the upper cutting edge 5 and located closer to the through hole 6 (a central axis S1). The phrase "central axis S1" is the axis that extends between the upper surface 2 and the lower surface 3, and serves as a rotation axis when the insert 1 is rotated in a top view.

The lower surface 3 includes a mount part 31 for mounting the holder 11 thereon. The mount part 31 has a shape having six top portions (points): three first top portions 311a to 311c (first distance points) spaced a distance a away from a central point O (the central axis S1); and three second top portions 312a to 312c (second distance points) spaced a distance b away from the central point O (the central axis S1). The three first top portions 311a to 311c and the three second top portions 312a to 312c are disposed alternately. The mount part 31 further has a concave part 32 including at least the central point O (the central axis S1). The phrase "central point O" denotes the intersection of the central axis S1 and a line obtained by extending the mount part 31 toward the central axis S1 in a side view (refer to FIG. 4). The phrase "side view" denotes a state that the insert 1 is viewed from the side surface 4.

In the present embodiment, the mount part 31 has a hexagonal shape having the six top portions in a bottom view. Specifically, as shown in FIG. 2(b), the mount part 31 has the hexagonal shape with the six top portions of the three first top portions 311a to 311c spaced a first distance (the distance a) away from the central point O (central axis S1), and the three second top portions 312a to 312c spaced a second distance (the distance b) away from the central point O (central axis S1). Thus, the individual top portions are respectively intersections of one side and another side of an outer edge 31a of the mount part 31, and the intersection of two sides may include a region chamfered in a curved surface and a flat surface as in the case of the present embodiment.

The first interior angle $\alpha$ at the foregoing major corners 21 is larger than an interior angle $\gamma$ at the first top portions 311 constituting the shape of the mount part 31. A second interior angle $\beta$ at the minor corners 22 is larger than an interior angle $\delta$ at the second top portions 312 constituting the shape of the mount part 31. Specifically, there are relationships of $\alpha < \gamma$ and $\beta > \delta$ as shown in FIG. 2.

Further, a bisector L1 of the interior angle $\gamma$ at the first top portion 311 and a bisector L2 of the major corners 21 are identical to each other, and a bisector L3 of the interior angle δ at the second top portion 312 and a bisector L4 of the minor corners 22 are identical to each other in the bottom view. That is, L1=L2 and L3=L4 as shown in FIG. 2(b). These configurations ensure that the insert 1 in the vicinity of the major corners 21 has a large thickness and the mount part 31 extends closer to the lower cutting edge 5P in the vicinity of the major corners 22, thereby further downsizing the insert 1.

The mount part 31 has the concave part 32 in the vicinity of the central point O (hereinafter referred to as a "middle part"), and hence the mount part 31 is more difficult to contact with a later-described contact surface 13 of the holder 11 than the case where the mount part 31 is formed by a flat surface and the contact surface 13 of the holder 11 is also a flat surface. Additionally, the first top portions 311 and the second top portions 312 function as a fixing point on the outer edge 31a of the mount part 31, thereby improving the attachment stability of the insert 1.

The concave part 32 depends on neither its size nor on its depth. In the present embodiment, the mount part 31 has a concave shape. That is, the mount part 31 of the present embodiment in its entirety corresponds to the concave part 32. Specifically, as shown in FIG. 2(b), the outer edge 31a of the mount part 31 corresponds to an outer edge 32a of the concave part 32. According to this configuration, a part of the mount part 31 located in the vicinity of the outer edge 31a and the contact surface 13 of the holder are contacted with each other. This achieves a smaller contact area and an enhanced fixing force, thus improving the attachment stability of the insert 1.

The second top portions 312 have a lower height position than the first top portions 311 in a height direction from the upper surface 2 to the lower surface 3. That is, the second top portions 312 are located on a nearer side from the upper surface 2 than the first top portions 311. In other words, the second top portions 312 are located closer to the upper surface 2, namely, more above than first top portions 311. More specifically, as shown in FIG. 3(b), h1>h2 where h1 is a height of the first top portions 311 and h2 is a height of the second top portions 312. In the present embodiment, these h1 and h2 are measured on the basis of a vertical plane S1B that is perpendicular to the central axis S1 and passes through a middle point M in a side view. However, the measurement may be made on the basis of a vertical plane S1b perpendicular to the central axis S1. According to the foregoing configuration, the vicinity of the first top portions 311 having a higher height position is first brought into contact with the contact surface 13 of the holder, and the vicinity of the second top portions 312 having the lower height position is thereafter brought into contact with the contact surface 13 of the holder 11. Therefore, the insert 1 can be supported by using the vicinity of the first top portions 311 as a major fixing point and the vicinity of the second top portions 312 lower than the first top portions 311 as a minor fixing point. This configuration improves the attachment stability of the insert 1.

The distance a from the central point O (central axis S1) to each of the first top portions 311 and the distance b from the central point O (central axis S1) to each of the second top portions 312 may be equal to each other (a=b), or may be different from each other (a≠b) in a bottom view. In the present embodiment, it is a>b as shown in FIG. 2(b). According to this configuration, the major fixing point (the vicinity of the first top portion 311) is located further away from the central point O than the minor fixing point (the vicinity of the second top portion 312), thus making it possible to suppress rotation of the insert 1.

Figure 4A:
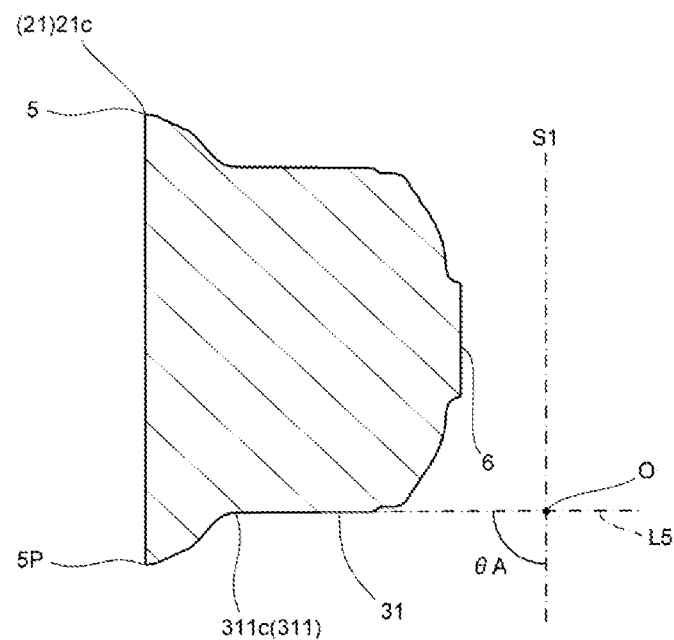
FIG. 4(a) is a view of the cutting insert shown in FIG. 2(a), specifically a partially enlarged view of a cross section taken along the line B-B.
Figure 4B:
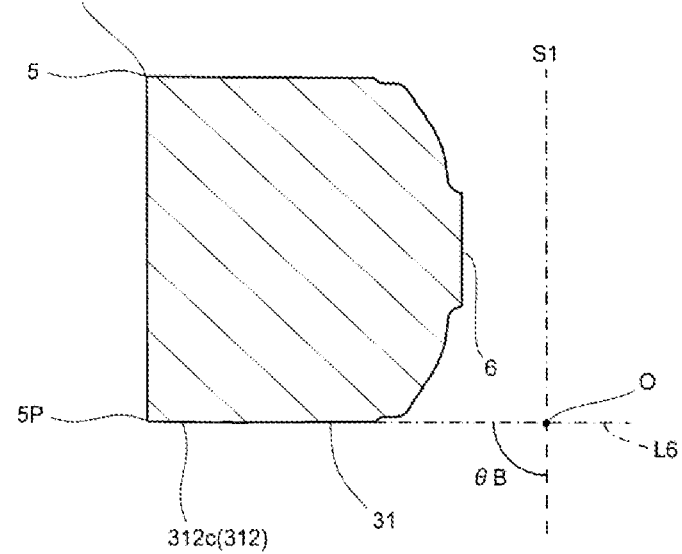
FIG. 4(b) is a partially enlarged view of a cross section taken along line C-C therein.

Angles formed by the central axis S1 and a straight line connecting the central point O and each of the six top portions may be set suitably. For example, all of these angles are different from one another. Alternatively, the angles at the three first top portions 311 may be identical to each other, and the angles at the three second top portions 312 may be identical to each other. In the present embodiment, as shown in FIG. 4, an angle θA formed by the central axis S1 and a straight line connecting the central point O and the first top portion 311 is identical to an angle θB formed by the central axis S1 and a straight line connecting the central point O and the second top portion 312. That is, in the mount part 31, the angle θA formed by the central axis S1 and a first extension line L5 obtained by extending the first top portion 311 toward the central axis S1, and the angle θB formed by the central axis S1 and a second extension line L6 obtained by extending the second top portion 312 toward the central axis S1 in a side view are identical to each other. That is, θA=θB as shown in FIG. 4. This configuration ensures effective dispersion of the stress exerted on the middle part of the insert 1.

Each of the angles θA and θB is preferably set at 80° to 90°. For example, when the mount part 31 is formed in a curved line shape, the first extension line L5 may be obtained by extending the first top portion 311 toward the central axis S1 so as to pass through an end portion of the curved surface shaped mount part 31 which is located inward. This is also true for the second extension line L6.

The outer edge 31a of the mount part 31 preferably has a curved surface shape protruding toward the upper surface 2 at an intermediate portion of the outer edge 31a located between the first top portion 311 and the second top portion 312. The outer edge 31a of the mount part 31 of the present embodiment has such an arc-like shape that is located closer to the upper surface 2 at the intermediate portion located between the first top portion 312 and the second top portion 312. According to this configuration, the portion of the outer edge 31a of the mount part 31 located between the first top portion 311 and the second top portion 312 is difficult to contact with the contact surface 13 of the holder, and hence the vicinity of the first top portion 311 and the vicinity of the second top portion 312 can be more surely used as the fixing point. Consequently, the attachment stability of the insert 1 is further improved. Specifically, as shown in FIG. 2(b), a region Q1 is the fixing point in the vicinity of the first top portion 311, and a region Q2 is the fixing point in the vicinity of the second top portion 312. The regions Q1 and Q2 are respectively brought into contact with the contact surface 13 of the holder 11.

An outer periphery of the mount part 31 connecting the first top portion 311 and the second top portion 312 in a bottom view may be a curved line or straight line, without being limited thereto. In the present embodiment, as shown in FIG. 2(b), the outer periphery connecting the first top portion 311 and the second top portion 312 adjacent thereto is the straight line in the bottom view. That is, in the present embodiment, a portion 31b of the outer edge 31a of the mount part 31 which connects the first top portion 311 and the second top portion 312 adjacent thereto has a straight line shape in the bottom view. This configuration makes constant a distance to the mount part 31 in the cutting edge 5, and hence the strength of the cutting edge 5 can be made uniform from one end portion thereof to the other end portion thereof. Therefore, the cutting resistance exerted on the mount part 31 can be made constant along the outer edge 31a, thereby further improving the attachment stability of the insert 1.

An inner wall 32b of the concave part 32 is formed by a circular cone shaped surface with the central point O as a vertex. That is, the inner wall 32b of the concave part 32 has the circular cone shape having the vertex on the central axis S1. According to this configuration, the inner wall 32b of the concave part 32 has no corner and hence contributes to stress mitigation, thereby reducing fracture of the insert 1.

The concave part 32 has a flat surface 33 that is located around the central axis S1 and is perpendicular to the central axis S1. A distance d1 from the first top portion 311 to the flat surface 33 is larger than a distance d2 from the second top portion 312 to the flat surface 33 in a bottom view. That is, d1>d2 as shown in FIG. 2(b). Even if a contact region extends to the concave part 32 when the insert 1 is adhered to the contact surface 13 of the holder 11 by a later-described fitting screw 12 as a fixing member, the above configuration can reduce contact between the vicinity of the central axis S1 and the contact surface 13 of the holder 11, thus ensuring more stable attachment of the insert 1.

The intersection (lower cutting edge 5P) of the lower surface 3 and the side surface 4 is preferably located at the same position as the second top portion 312 or located closer to the upper surface 2, namely, more above than the second top portion 312 in a side view. In the present embodiment, as shown in FIG. 4, a height position of the intersection (lower cutting edge 5P) of the lower surface 2 and the side surface 3 is identical to or lower than the height position of the second top portion 312 of the mount part 31. This configuration reduces a risk that the intersection of the lower surface 2 and the side surface 3, namely, the lower cutting edge 5P is damaged by being strongly pressed against the contact surface 13 of the holder 11 in the case of the double-sided insert 1 as in the present embodiment.

In the present embodiment, the flat surface 33 has a triangular shape having a vertex on a bisector of the angle at each of the minor corners 22 as shown in FIG. 2(b). According to this configuration, the regions Q2 have a small area, and hence the force received by the fitting screw 12 can effectively be converted to fixing force.

Further in the present embodiment, as shown in FIG. 2(b), the outer periphery of the through hole 6 is located inside a region surrounded by straight lines connecting three top portions of the triangular-shaped flat surface 33 in a bottom view. This configuration reduces a risk that the fitting screw 12 inserted into the through hole 6 is located higher than the height of the mount part 31, and generated chips collide with the fitting screw 12 and scatter in all directions in the case of the double-sided insert 1 as in the present embodiment.

The upper cutting edge 5 includes a corner cutting edge 51, a minor cutting edge 52 and a major cutting edge 53. Specifically, as shown in FIGS. 2(a) and 3(a), the upper cutting edge 5 includes the corner cutting edge 51, the minor cutting edge 52 inclined downward, namely toward the lower surface 3 as separating from the corner cutting edge 51 at a first inclination angle θ1 on the basis of a vertical plane S1b perpendicular to the central axis S1, and the major cutting edge 53 inclined downward, namely toward the lower surface 3 as separating from the minor cutting edge 52 at a second inclination angle θ2 larger than the first inclination angle θ1 on the basis of the vertical plane S1b. The corner cutting edge 51, the minor cutting edge 52 and the major cutting edge 53 are located sequentially, for example, from the first major corner 21a of the three major corners 21 to each of the first minor corner 22a and the second minor corner 22b of the three minor corners 22, both of which are adjacent to the first major corner 21a. Therefore, the insert 1 of the present embodiment is capable of having both low cutting resistance and excellent fracture resistance in cooperation with the major corners 21 having the first interior angle α and the minor corners 22 having the second interior angle β as described above.

In the present embodiment, the phrase "first inclination angle θ1" denotes an angle formed by the vertical plane S1b and a virtual extension line L7 of the minor cutting edge 52, and the phrase "second inclination angle θ2" denotes an angle formed by the vertical plane S1b and a virtual extension line L8 of the major cutting edge 53. The phrase "virtual extension line L7" denotes a straight line obtained by extending a tangential line at a start point of the minor cutting edge 52, namely, an end portion of the minor cutting edge 52 located closer to the corner cutting edge 51. Similarly, the phrase "virtual extension line L8" denotes a straight line obtained by extending a tangential line at a start point of the major cutting edge 53, namely, an end portion of the major cutting edge 53 located closer to the minor cutting edge 52.

The corner cutting edge 51 is located at an intersection of a later-described major corner side surface 41 of the side surface 4 and the upper surface 2. The corner cutting edge 51 functions to reduce fracture of the major cutting edge 5 due to a cutting force applied thereto during the cutting process. The corner cutting edge 51 has a curved line shape in a top view. In the present embodiment, the corner cutting edge 51 is perpendicular to the central axis S1 and is parallel to the vertical plane S1b.

The minor cutting edge 52 is located closer to the corner cutting edge 51 in an intersection of a later-described first side surface 42 of the side surface 4 and the upper surface 2. As shown in FIG. 2(a), the minor cutting edge 52 functions as first and second major cutting edge sections 5a and 5c together with the major cutting edge 53. The minor cutting edge 52 is also a cutting edge, so-called flat drag, functioning mainly to improve the accuracy of a later-described finished surface 102 of a workpiece 100. In the present embodiment, the minor cutting edge 52 has a straight line shape.

The major cutting edge 53 is located closer to the first minor corner 22a (second minor corner 22b) in an intersection of the first side surface 42 and the upper surface 2. The major cutting edge 53 functions mainly to generate chips during the cutting process. In the present embodiment, the major cutting edge 53 has a concave shape recessed toward the lower surface 3 in a side view.

Thus, the upper cutting edge 5 is inclined toward the lower surface 3 as going to the corner cutting edge 51, the minor cutting edge 52 and the major cutting edge 53. Consequently, the upper cutting edge 5 has high cutting edge strength on one side thereof closer to the corner cutting edge 51, and also achieves the low cutting resistance on the other side thereof closer to the major cutting edge 53. Although the thickness of the insert 1 is decreased as going to the corner cutting edge 51, the minor cutting edge 52 and the major cutting edge 53, the distance from the through hole 6 to each of the cutting edges is increased. This configuration ensures high cutting edge strength in each of cutting edge regions.

Similarly to the upper cutting edge 5, the lower cutting edge 5P also has a corner cutting edge 51P, a minor cutting edge 52P and a major cutting edge 53P. The configurations of the corner cutting edge 51P, the minor cutting edge 52P and the major cutting edge 53P are respectively identical to those of the corner cutting edge 51, the minor cutting edge 52 and the major cutting edge 53.

The side surface 4 is the surface functioning as a so-called clearance part for reducing contact with the workpiece 100. In the present embodiment, the side surface 4 is perpendicular to the upper surface 2 and the lower surface 3 as shown in FIG. 3. Compared with an insert whose side surface has a clearance angle between the upper surface 2 or the lower surface 3, the thickness of the insert 1 can be ensured, and hence the insert 1 has excellent fracture resistance.

As a specific configuration, the side surface 4 connected to the hexagonal shaped upper surface 2 has a major corner side surface 41, a first side surface 42, a minor corner side surface 43 and a second side surface 44, which are located sequentially from the first major corner 21a to the second major corner 21b (third major corner 21c) as shown in FIG. 3(a). Both the first side surface 42 and the second side surface 44 are flat surfaces, and both the major corner side surface 41 and the minor corner side surface 43 are curved surfaces.

The through hole 6 functions to fix the insert 1 to the later-described holder 11. That is, a fitting screw 12 (fixing member) is inserted into the through hole 6 and is further screwed to the holder 11. A cutting tool 10 is obtained by fixing the insert 1 to the holder 11 in this manner. The central axis of the through hole 6 exists at the same position as the central axis S1.

<Cutting Tool>

A cutting tool according to an embodiment of the present invention is described in details below with reference to FIGS. 5 to 8.

Figure 5A:
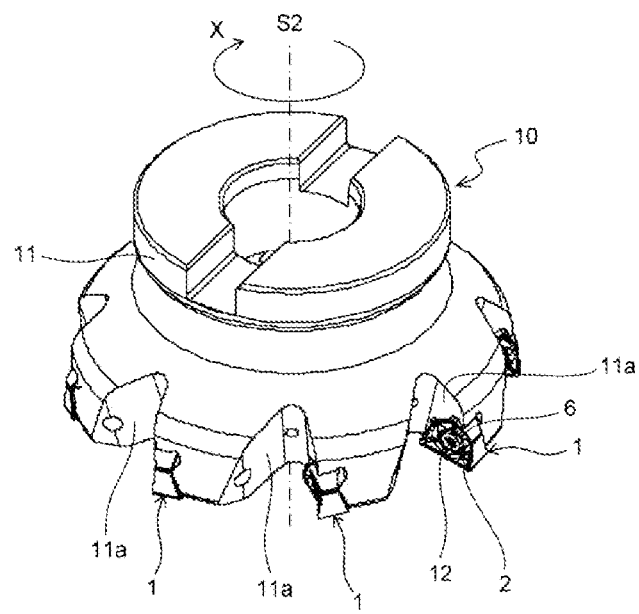
FIG. 5(a) is a perspective view of a cutting tool according to an embodiment of the present invention.
Figure 5B:
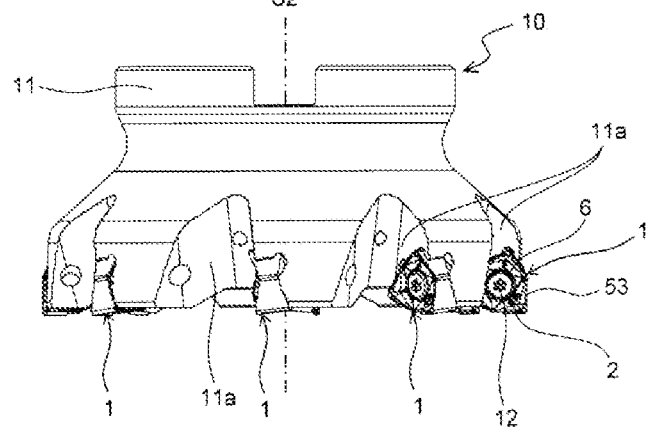
FIG. 5(b) is a side view thereof.

As shown in FIG. 5, the cutting tool 10 of the present embodiment includes a plurality of inserts 1 as described above, and a cylindrical shaped holder 11 having a rotation axis S2. The holder 11 is configured to attach the plurality of inserts 1 thereto by using a fixing member.

Figure 7A:
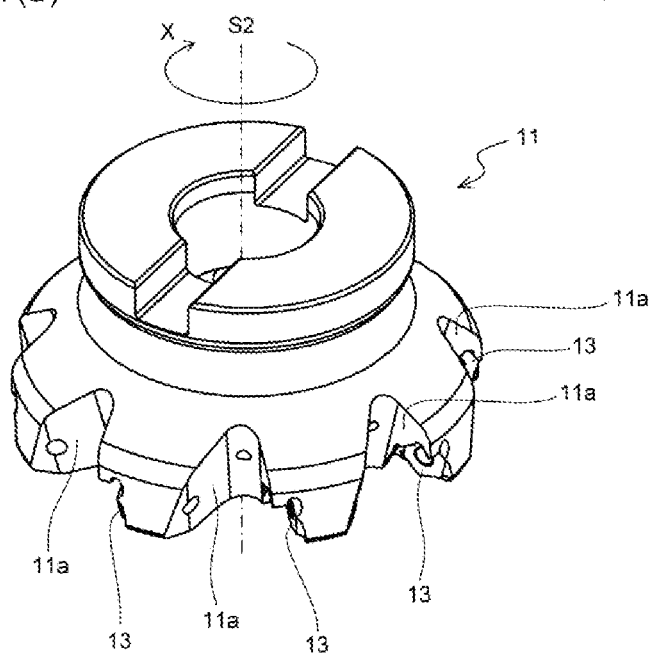
FIG. 7(a) is a perspective view of a holder in the cutting tool shown in FIG. 5.
Figure 7B:
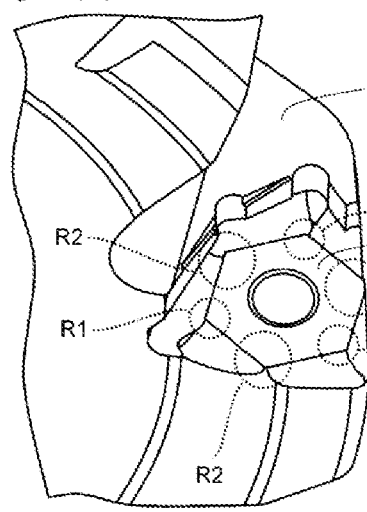
FIG. 7(b) is a partially enlarged perspective view of an insert pocket.
Figure 7C:
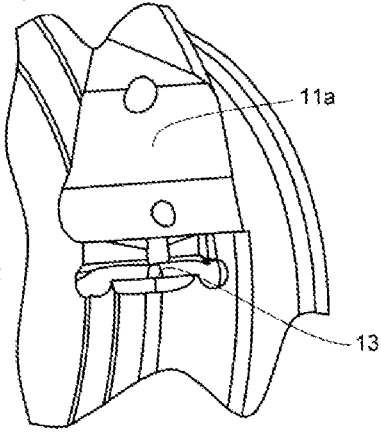
FIG. 7(c) is a partially enlarged side view of the insert pocket.

The holder 11 has a plurality of insert pockets 11a at outer peripheral front ends thereof as shown in FIG. 7. The inserts 1 are respectively attached to outer peripheral positions in the insert pockets 11a. Specifically, when the cutting tool 10 is rotated in the direction indicated by arrow X in FIG. 5, the inserts 1 are attached so that the upper surface (rake surface) 2 is oriented forward in the direction indicated by the arrow X as the rotation direction, and the major cutting edge 53 is located at the outermost periphery of the holder 11. As an attachment method, the plurality of inserts 1 are respectively fixed to the holder 11 by inserting the fitting screw 12 (fixing member) into each of the through holes 6 of the plurality of inserts 1, and by screwing the fitting screw 12 to the holder 11.

Each of the insert pockets 11a of the holder 11 has a contact surface 13 brought into contact with the insert 1 as shown in FIG. 7. Specifically, when the cutting tool 10 is rotated in the direction indicated by the arrow X, the contact surface 13 is located in a direction opposed to the forward side in the direction indicated by the arrow X as the rotation direction. The contact surface 13 is preferably formed by a flat surface in order to sufficiently produce the effect of the mount parts 31 of the inserts 1.

From the viewpoint of improving the attachment stability of the inserts 1, the contact surface 13 preferably has a substantially identical or similar shape to the shape of the mount parts 31 of the inserts 1 in a bottom view, as shown in FIG. 7(b). The contact surface 13 of the present embodiment has a substantially identical shape to the shape of the mount parts 31 of the inserts 1 in the bottom view.

Figure 8A:
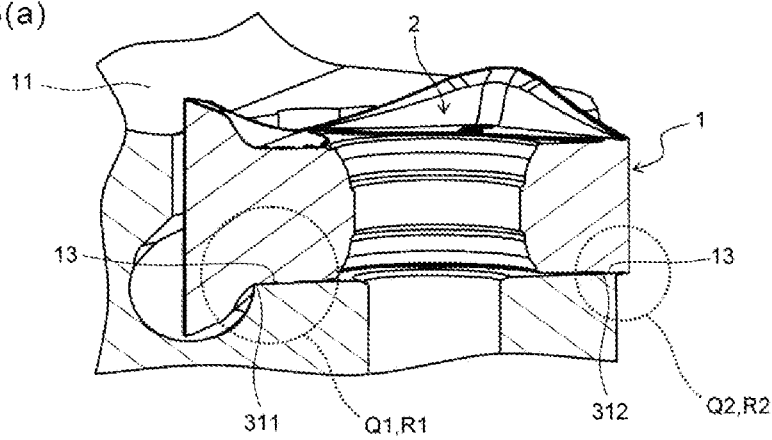
FIG. 8(a) is a sectional view of the cutting tool shown in FIG. 6(b), specifically a partially enlarged view of a cross section taken along line E-E therein.
Figure 8B:
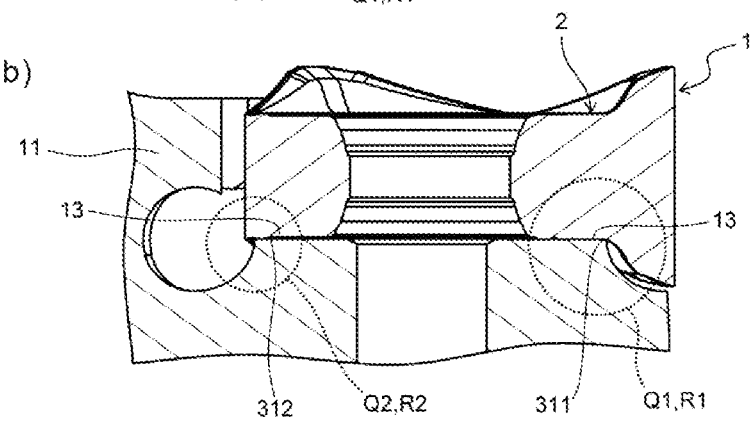
FIG. 8(b) is a partially enlarged view of a cross section taken along line F-F therein.
Figure 8C:
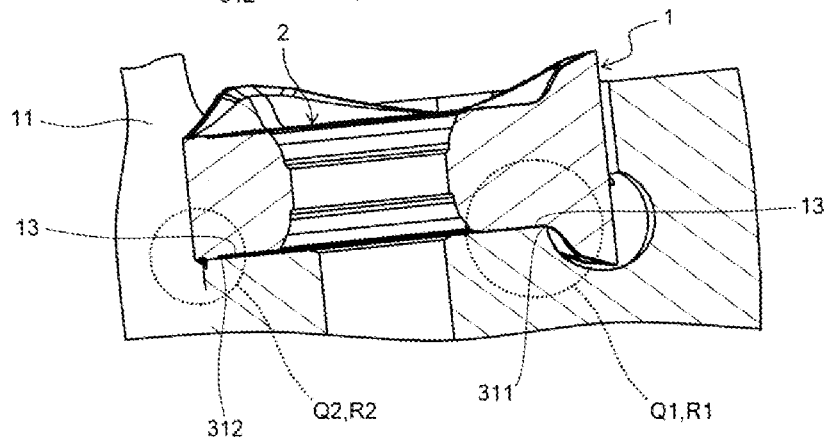
FIG. 8(c) is a partially enlarged view of a cross section taken along line G-G therein.

Also from the viewpoint of improving the attachment stability of the inserts 1, each of the inserts 1 is preferably contactedly fixed to the three first top portions 311 of the contact surface 13 of the insert pocket 11a. For example, in the present embodiment, at least three regions Q1 including the three first top portions 311 of the insert 1 are contactedly fixed to the three first contact regions R1 of the flat contact surface 13 as shown in FIGS. 2(b) and 7(b). Further in the present embodiment, the contact surface 13 of the insert pocket 11a has, besides first contact regions R1, three second contact regions R2 brought into contact with the three regions Q2 including the three second top portions 312 of the insert 1. This configuration further improves the attachment stability of the inserts 1. FIG. 8 shows a state that the regions Q1 of the insert 1 and the first contact regions R1 of the contact surface 13 are contacted with each other, and the regions Q2 of the insert 1 and the second contact regions R2 of the contact surface 13 are contacted with each other.

The present embodiment has described the aspect that the contact surface 13 has the shape substantially identical to the shape of the mount part 31 of the insert 1 in the bottom view, without being limited thereto. That is, the contact surface 13 may be configured by reducing or enlarging the shape of the mount part 31 of the insert 1 in the bottom view within a range of possible contact with the regions Q1 and Q2 of the insert 1. Alternatively, the contact surface 13 preferably has such a shape to permit proper contact with the regions Q1 and Q2.

Figure 6A:
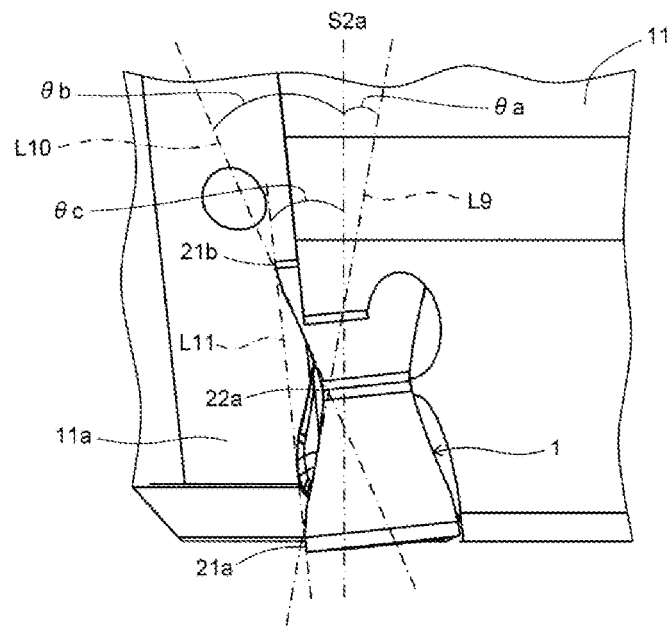
FIG. 6(a) is a side view showing in enlarged scale an attachment condition of the cutting insert in the cutting tool of FIG. 5, specifically a view of the cutting insert taken from a side surface thereof.

In the present embodiment, as shown in FIG. 6(a), each of the inserts 1 is attached to the holder 11 in a state that a first major cutting section 5a of an upper cutting edge 5 extending from a first major corner 21a to a first minor corner 22a adjacent thereto has a positive axial rake angle θa, and a non-cutting section 5b of the upper cutting edge 5 extending from the first minor corner 22a to a second major corner 21b adjacent thereto has a negative axial rake angle θb on the basis of a parallel plane S2a parallel to a rotation axis S2 of the holder 11.

The first major cutting section 5a includes a minor cutting edge 52 and a major cutting edge 53, and has a positive axial rake angle θa both in the minor cutting edge 52 and the major cutting edge 53 in the present embodiment. For example, the axial rake angle of the minor cutting edge 52 is preferably set at 0° to 10°, and the axial rake angle of the major cutting edge 53 is preferably set at 5° to 20°. With respect to a curved line shaped cutting edge, such as the major cutting edge 53, the axial rake angle θa may be measured using a straight line L9 obtained by extending a tangential line at a start point of the major cutting edge 53, namely, an end portion thereof located closer to the minor cutting edge 52. The axial rake angle θb may be measured using a straight line L10 obtained by extending a tangential line at a start point of the non-cutting section 5b, namely, an end portion thereof located closer to the first minor corner 22a.

As shown in FIG. 6(a), each of the inserts 1 is also attached to the holder 11 in a state that a straight line L11 connecting the first major corner 21a and the second major corner 21b of the upper cutting edge 5 has a negative axial rake angle θc. In other words, the entirety including the first major cutting section 5a and the non-cutting section 5b has a negative axial rake angle.

The cutting tool 10 is obtained by attaching the inserts 1 to the holder 11 in the above manner. A workpiece 100 can be subjected to a face milling process or a plunge milling process as described later by rotating the cutting tool 10 in the direction indicated by the arrow X.

Figure 6B:
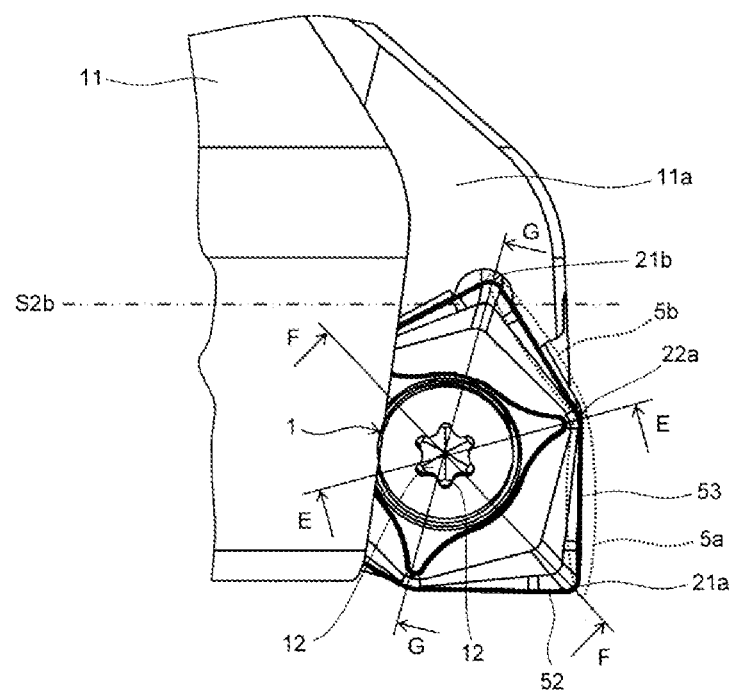
FIG. 6(b) is a view of the cutting insert taken from an upper surface thereof.

For example, when the face milling process is performed as shown in FIG. 6(b), a cutting target surface 101 is formed by cutting the workpiece 100 with the first major cutting section 5*a* of the insert 1, and a finished surface 102 is formed by cutting the workpiece 100 with the minor cutting edge 52. Hereat, a setting is made so that the minor cutting edge 52 has a substantially parallel relationship with a vertical plane S2*b* perpendicular to the rotation axis S2 of the holder 11.

<Method of Manufacturing Machined Product>

Next, methods of manufacturing a machined product according to a first or second embodiment of the present invention are described in details below with reference to FIGS. 9 and 10.

The method of manufacturing a machined product according to the first or second embodiment includes rotating the foregoing cutting tool 10 on the basis of the rotation axis S2 of the holder 11; bringing the upper cutting edge 5 of the cutting tool 10 being rotated into contact with a surface of the workpiece 100; and separating the cutting tool 10 from the workpiece 100. The first and second embodiments are respectively described in details below.

First Embodiment

Figure 9A:
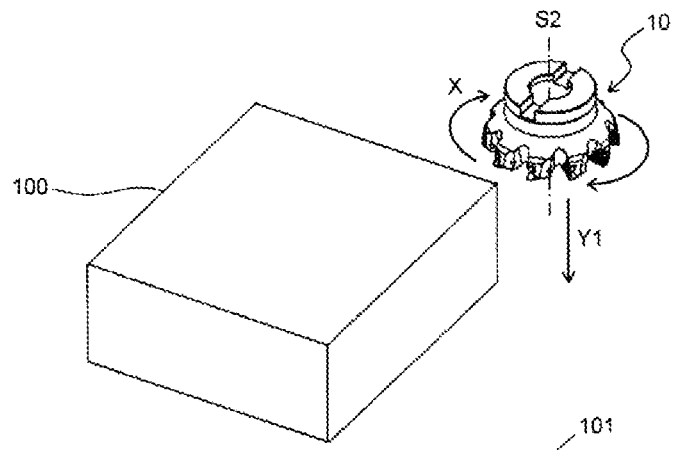
FIGS. 9(a) to 9(c) are process drawings showing a method of manufacturing a machined product according to a first embodiment of the present invention.
Figure 9B:
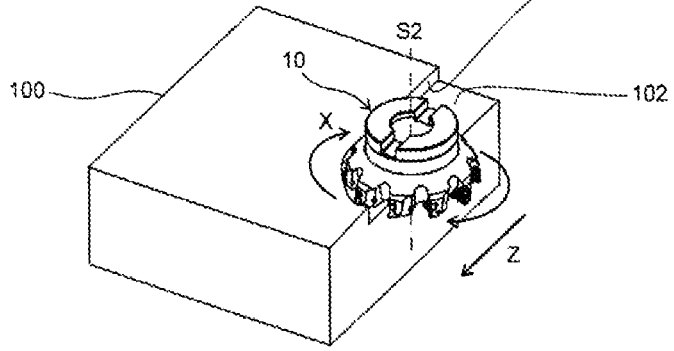
Figure 9C:
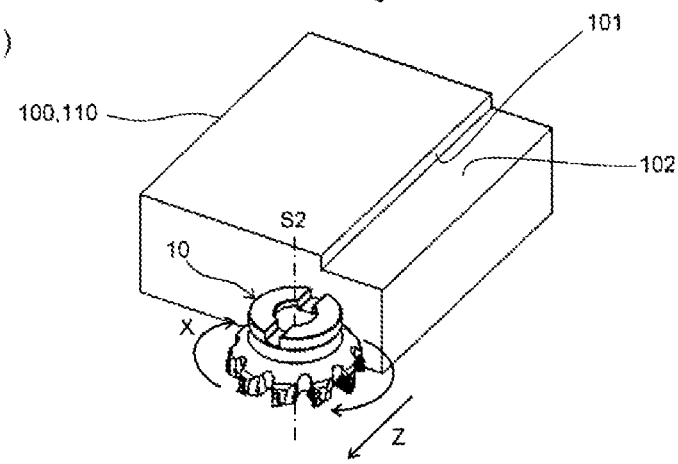

The method of manufacturing a machined product according to the first embodiment is described in details with reference to FIG. 9 by taking the example of so-called face milling process.

The method of manufacturing a machined product according to the present embodiment includes the following steps (i) to (iii). In the following, the order of these steps may be changed suitably unless otherwise stated.

The step (i) includes: rotating the cutting tool 10 around the rotation axis S2 of the holder 11 (cutting tool 10) in the direction indicated by the arrow X as shown in FIG. 9(*a*); and bringing the cutting tool 10 near the workpiece 100 by moving the cutting tool 10 in the direction indicated by arrow Y1.

The step (ii) is to bring the upper cutting edge 5 of the cutting tool 10 being rotated into contact with the surface of the workpiece 100 as shown in FIG. 9(*b*). In the present embodiment, the step (ii) includes the following three substeps.

The first substep is to allow the cutting tool 10 being rotated to move in the direction indicated by arrow Z that is the direction perpendicular to the rotation axis S2. Thereby, the workpiece 100 can be subjected to the face milling process.

The second substep is to bring the first major cutting section 5*a* of the upper cutting edge 5 extending from the first major corner 21*a* to the first minor corner 22*a* adjacent thereto in the cutting tool 10 being rotated, into contact with the surface of the workpiece 100. Consequently, a cutting target surface of the workpiece 100 cut by being brought into contact with the first major cutting section 5*a* becomes a finished surface 101 as shown in FIG. 9(*b*).

The third substep is to bring the minor cutting edge 52 of the upper cutting edge 5 located between the first major corner 21*a* and the second minor corner 22*b* in the cutting tool 10 being rotated, into contact with the cutting target surface of the workpiece 100 formed by being brought into contact with the first major cutting section 5*a*. Thereby, a portion of the cutting target surface of the workpiece 100 cut by the first major cutting section 5*a* in the foregoing second substep, which remains without being directly cut by the first major cutting section 5*a*, can be smoothed by the minor cutting edge 52, resulting in a finished surface 102 as shown in FIG. 9(*b*).

The step (iii) is to separate the cutting tool 10 from the workpiece 100 by moving the cutting tool 10 just as it is in the direction indicated by arrow Z, as shown in FIG. 9(*c*).

A machined product 110, which is obtained by cutting the workpiece 100 into the desired shape as shown in FIG. 9(*c*), is manufactured by being subjected to the foregoing individual steps.

When the cutting process is continuously performed, for example, it is required to repeat the step of bringing the upper cutting edge 5 of the cutting tool 10 into contact with different portions of the workpiece 100, while keeping the rotation of the cutting tool 10. When the major corner 21 of the upper cutting edge 5 used for the cutting process is worn, the major corner 21 of the upper cutting edge 5 not yet being used can be used by rotating the insert 1 by 120° with respect to the central axis S1. Additionally in the present embodiment, the single major corner 21 of the insert 1 is usable for a reverse-handed cutting process by rotating the cutting tool 10 in the opposite direction to the direction indicated by the arrow X. This permits use as the insert substantially having the six major corners by using each of the three major corners 21 for right-handed and left-handed operations. By changing the rotation direction of the cutting tool 10 to the opposite direction to that indicated by the arrow X, the minor cutting edge 52 in the first major cutting section 5*a* functions as a cutting edge for forming the finished surface 102. In the present embodiment, the description of the upper cutting edge 5 is also true for the lower cutting edge 5P.

The following modifications are applicable to the foregoing steps. For example, in the step (i), the workpiece 100 may be rotated while keeping the cutting tool 10 stationary. Alternatively, the cutting tool 10 and the workpiece 100 need to be closer to each other. For example, the workpiece 100 may be brought near the cutting tool 10. Similarly, in the step (iii), the workpiece 100 and the cutting tool 10 need to be separated from each other. For example, the workpiece 100 may be separated from the cutting tool 10 being held at a predetermined position. These modifications are also applicable to the following second embodiment.

Second Embodiment

Figure 10A:
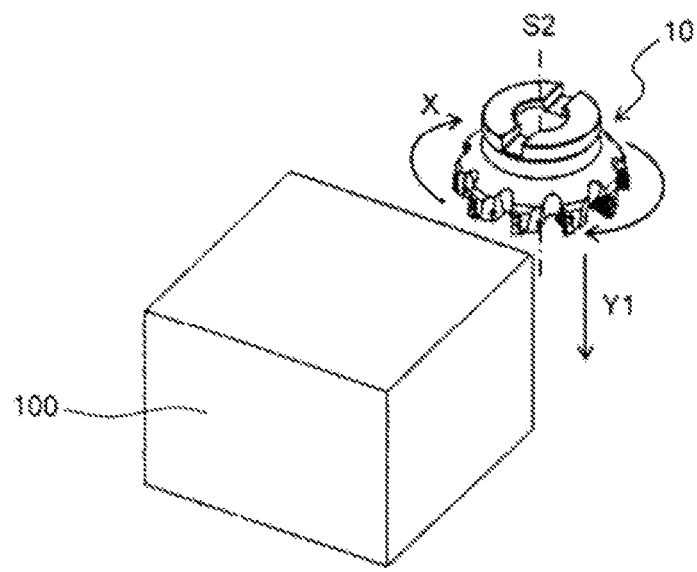
FIGS. 10(a) to 10(c) are process drawings showing a method of manufacturing a machined product according to a second embodiment of the present invention.

The method of manufacturing a machined product according to the second embodiment is described in details with reference to FIG. 10 by taking the example of so-called plunge milling process.

The method of manufacturing a machined product according to the present embodiment includes the following steps (i) to (iii). In the following, the order of these steps may be changed suitably unless otherwise stated.

The step (i) includes: rotating the cutting tool 10 around the rotation axis S2 of the holder 11 (cutting tool 10) in the direction indicated by arrow X as shown in FIG. 10(*a*); and bringing the cutting tool 10 near the workpiece 100 by moving the cutting tool 10 in the direction indicated by arrow Y1.

The step (ii) is to bring the upper cutting edge 5 of the cutting tool 10 being rotated into contact with a surface of the workpiece 100 as shown in FIG. 10(*b*). In the present embodiment, the step (ii) includes the following three substeps.

The first substep is to allow the cutting tool 10 being rotated to move in the direction indicated by the arrow Y1 that is the direction parallel to the rotation axis S2. Thereby, the workpiece 100 can be subjected to the plunge milling process.

Figure 10B:
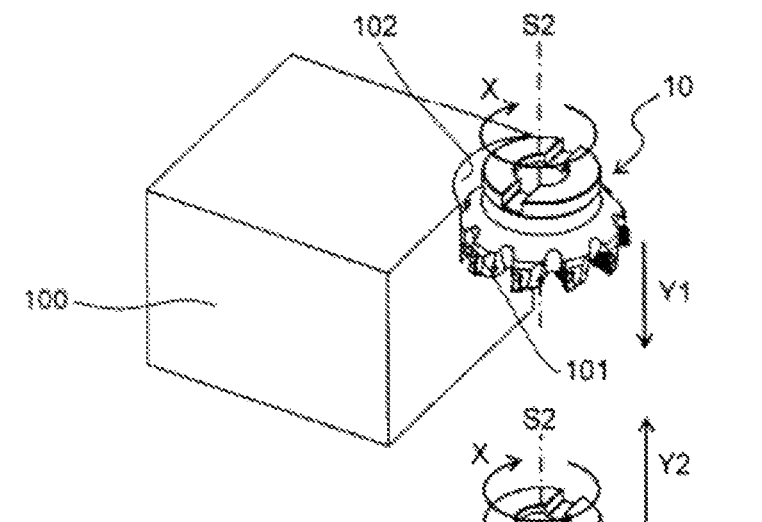

The second substep is to bring the second major cutting section 5c of the upper cutting edge 5 extending from the first major corner 21a to the second minor corner 22b adjacent thereto in the cutting tool 10 being rotated, into contact with the surface of the workpiece 100. Consequently, a cutting target surface of the workpiece 100 cut by being brought into contact with the second major cutting section 5c becomes a finished surface 101 as shown in FIG. 10(b).

The third substep is to bring the minor cutting edge 52 of the upper cutting edge 5 located between the first major corner 21a and the first minor corner 22a in the cutting tool 10 being rotated, into contact with the cutting target surface of the workpiece 100 formed by being brought into contact with the second major cutting section 5c. Thereby, a portion of the cutting target surface of the workpiece 100 cut by the second major cutting section 5c in the foregoing second substep, which remains without being directly cut by the second major cutting section 5c, can be smoothed by the minor cutting edge 52, resulting in a finished surface 102 as shown in FIG. 10(b).

Figure 10C:
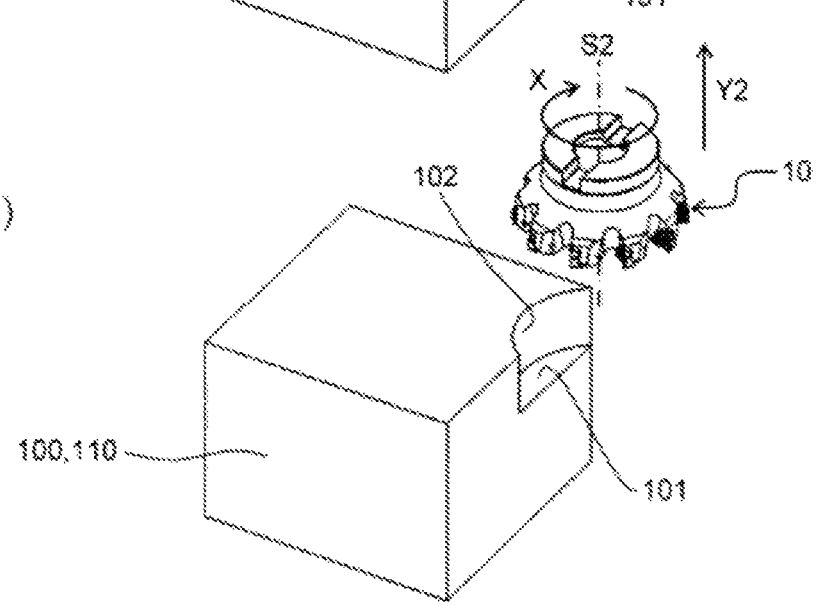

The step (iii) is to separate the cutting tool 10 from the workpiece 100 by moving the cutting tool 10 in the direction indicated by arrow Y2, as shown in FIG. 10(c).

A machined product 110, which is obtained by cutting the workpiece 100 into the desired shape as shown in FIG. 10(c), is manufactured by being subjected to the foregoing individual steps.

When the cutting process is continuously performed, it is required to perform similarly to the foregoing first embodiment.

While the several embodiments of the present invention have been illustrated and described, it is to be understood that the present invention is not limited to the foregoing embodiments but various changes and modifications can be made therein without departing from the spirit or scope of the present invention.

For example, the upper surface 2 and the lower surface 3 may have different colors though not particularly mentioned in the inserts 1 of the foregoing embodiments. Specifically, for example, when an insert body is made of silver-colored cemented carbide, either the upper surface 2 or the lower surface 3 is preferably coated with gold-colored titanium nitride (TiN). In the negative-type insert, both the upper surface 2 and the lower surface 3 function as the rake surface, and hence an erroneous attachment of the inserts might occur. By coating either the upper surface 2 or the lower surface 3 with TiN, a surface coated with TiN and an uncoated surface have different colors. It is therefore capable of clearly distinguishing between these two surfaces, thereby reducing misrecognition when attaching the inserts 1. Hereat, a coating target surface of either the upper surface 2 or the lower surface 3 need not be entirely coated. A similar effect is obtainable by coating, for example, a part of the coating target surface (e.g., a portion other than the cutting edges) with TiN. The material used for the coating is not limited to TiN as long as one can recognize a color difference between the upper surface 2 and the lower surface 3. For example, when the insert body is made of cemented carbide, it is also possible to employ bright reddish brown colored titanium carbonitride (TiCN), dark reddish brown colored titanium aluminum nitride (TiAlN), or the like.

Although not being particularly described in the inserts 1 of the foregoing embodiments, the upper cutting edge 5 may be configured to have a land (not shown) substantially parallel to the vertical plane S1b. This configuration improves the strength of the upper cutting edge 5, thus making it possible to suitably use the inserts 1 under machining conditions of so-called heavy-duty cutting.

Although the upper surface 2 of the inserts 1 of the foregoing embodiments has the hexagonal shape, the upper surface 2 may have any polygonal shape other than the hexagonal shape.

What is claimed is:

1. A cutting insert, comprising:
   a first surface;
   a second surface located opposite to the first surface and comprising:
      a first corner having a convex curved shape;
      a second corner having a convex curved shape;
      a first side connected to the first corner and the second corner;
      a second side extending from the first corner;
      a third side extending from the second corner; and
      an inner part comprising a first vertex portion correspondingly located inward of the first corner and a second vertex portion correspondingly located inward of the second corner;
   a side surface connected to both the first surface and the second surface; and
   an edge located at an intersection of the first surface and the side surface, wherein
   each of the first side, the second side and the third side is straight in a front view of the second surface,
   a first interior angle formed by the first side and the second side is smaller than a second interior angle formed by the first side and the third side in the front view,
   the second vertex portion has a third interior angle smaller than the second interior angle in the front view, and
   the inner part further comprises an other surface configured not to attach the holder and located correspondingly to the second corner.

2. A cutting tool, comprising:
   the cutting insert according to claim 1; and
   a holder configured to attach the cutting insert thereto.

3. The cutting tool according to claim 2, wherein
   the holder comprises an insert pocket at an outer peripheral front end thereof, the insert pocket being configured to attach the cutting insert thereto,
   the insert pocket comprises a contact surface brought into contact with the inner part of the cutting insert, and
   the cutting insert is attached to the holder so as to bring the first vertex portion into contact with the contact surface.

4. A method of manufacturing a machined product, comprising:
   rotating the cutting tool according to claim 1 on a basis of a rotation axis of the holder;
   bringing the edge of the cutting tool being rotated into contact with a surface of a workpiece; and
   separating the cutting tool from the workpiece.

5. The cutting insert according to claim 1, wherein
   the second surface comprises three of the first corner and three of the second corner, and
   the inner part comprises three of the first vertex portion and three of the second vertex portion.

6. The cutting insert according to claim 1, further comprising:
   a through hole extending between the first surface and the second surface, wherein
   the inner part is located so as to surround the through hole in the front view.

7. The cutting insert according to claim 1, wherein the other surface is symmetrical to bisector of the second corner in the front view.

8. The cutting insert according to claim 1, wherein the inner part comprises a first part corresponding to the first corner and a second part corresponding to the second corner, and
a width of the first part along bisector of the first corner is larger than a width of the second part along bisector of the second corner in the front view.

9. The cutting insert according to claim 1, wherein, a single line intersects the second corner, a central axis of the cutting insert and the second vertex portion in the front view.

10. The cutting insert according to claim 1, wherein the first vertex portion has a fourth interior angle larger than the first interior angle in the front view.

11. A cutting insert, comprising:
a first surface;
a second surface located opposite to the first surface;
a side surface connected to each of the first surface and the second surface;
a first edge located at an intersection of the first surface and the side surface, and
a second edge located at an intersection of the second surface and the side surface, wherein
the second surface comprises:
    a first corner having a convex curved shape;
    a second corner having a convex curved shape;
    a first side connected to the first corner and the second corner;
    a second side extending from the first corner;
    a third side extending from the second corner;
    a rake surface located along the second edge; and
    a mount part located closer to a center of the second surface than the rake surface;
each of the first side, the second side and the third side is straight in a front view of the second surface,
the mount part comprises:
    a first vertex portion located inward of the first corner; and
    a second vertex portion located inward of the second corner and closer to the first surface than the first vertex portion; and
a first interior angle formed by the first side and the second side is smaller than a second interior angle formed by the first side and the third side in the front view.

12. The cutting tool according to claim 11, wherein each of the second surface and the mount part has a hexagonal shape.

13. The cutting insert according to claim 11, wherein the second surface comprises three of the first corner and three of the second corner, and
the mount part comprises three of the first vertex portion and three of the second vertex portion.

14. The cutting insert according to claim 11, further comprising:
a through hole extending between the first surface and the second surface, wherein
the mount part is located so as to surround the through hole in the front view.

15. The cutting insert according to claim 11, wherein the mount part further comprises an other surface configured not to attach the holder and located correspondingly to the second corner.

16. The cutting insert according to claim 15, wherein the other surface is symmetrical to bisector of the second corner in the front view.

17. The cutting insert according to claim 11, wherein the mount part comprises a first part corresponding to the first corner and a second part corresponding to the second corner, and
a width of the first part along bisector of the first corner is larger than a width of the second part along bisector of the second corner in the front view.

18. The cutting insert according to claim 11, wherein, a single line intersects the second corner, a central axis of the cutting insert and the second vertex portion in the front view.

19. The cutting insert according to claim 11, wherein the first vertex portion has a fourth interior angle larger than the first interior angle in the front view.

* * * * *